June 19, 1945.  R. B. MASON  2,378,782
PARAFFIN ISOMERIZATION PROCESS
Filed Oct. 21, 1941
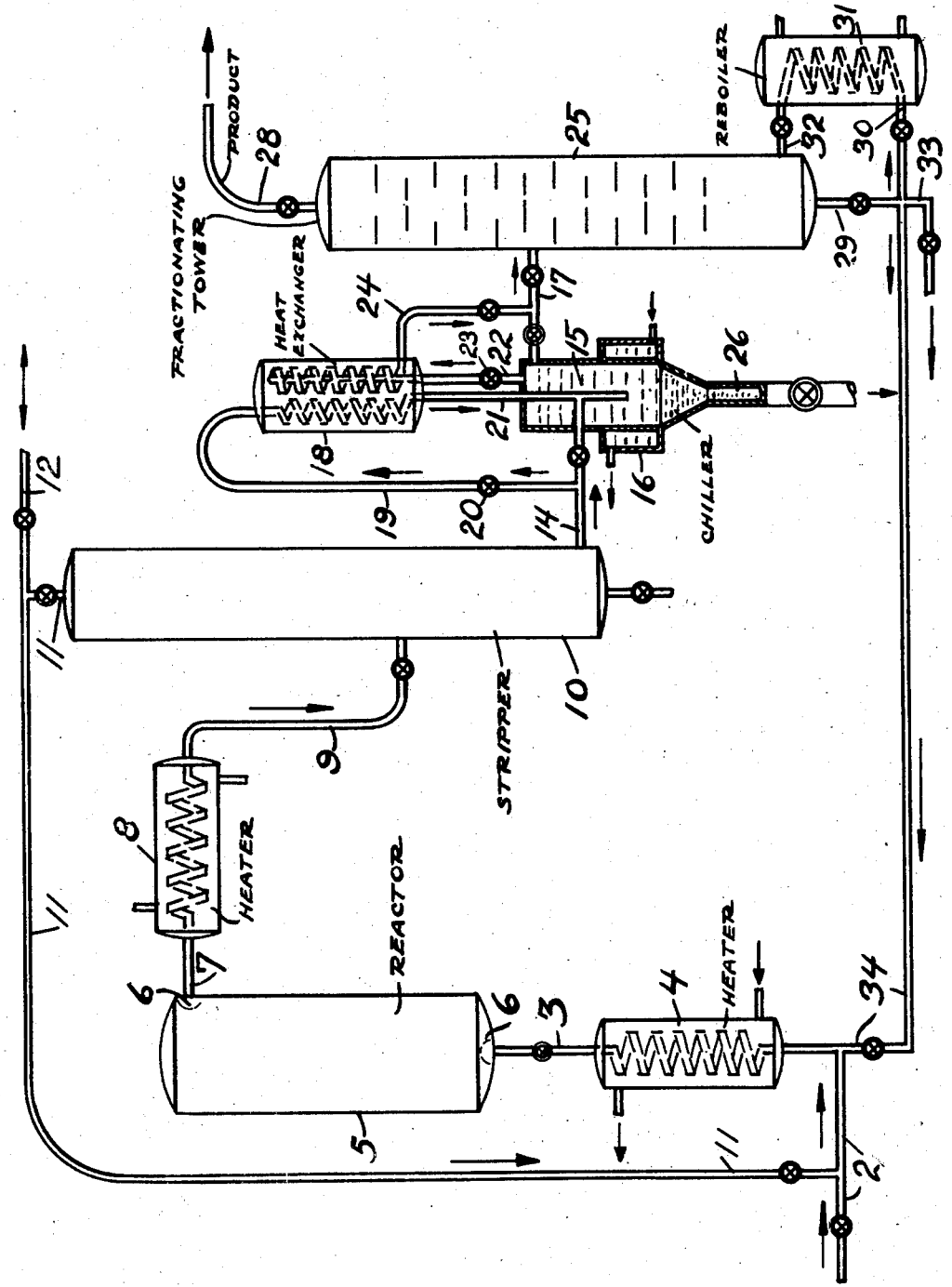
Ralph Burgess Mason Inventor
By P. L. Young Attorney Patented June 19, 1945

2,378,782

UNITED STATES PATENT OFFICE 2,378,782

PARAFFIN ISOMERIZATION PROCESS

Ralph Burgess Mason, Baton Rouge, La., assignor to Standard Oil Development Company, a corporation of Delaware Application October 21, 1941, Serial No. 415,859

9 Claims. (Cl. 260—683.5)

The present invention relates to the process of isomerizing straight chain hydrocarbons, in particular n-butane or n-pentane to produce the corresponding isoparaffins of branched chain structure, in particular isobutane and isopentane.

It has heretofore been known to employ the various Friedel-Crafts type catalysts, such as, for example, the chlorides and bromides of aluminum, iron, zinc, and the like as catalytic agents for effectuating the isomerization of normal paraffins of at least four carbon atoms per molecule to isoparaffins having the same number of carbon atoms per molecule. These catalysts have heretofore been employed with promoters, such as, for example, water, the hydrogen halides, such as, hydrogen chloride, hydrogen bromide, hydrogen fluoride, the free halogens, such as, chlorine and bromine, the alkyl halides, such as, methyl, ethyl, propyl or butyl chlorides or bromides, the alkyl polyhalides, such as, for example, chloroform, carbon tetrachloride, and the like. The iso-paraffinic hydrocarbon products present various physical and chemical characteristics and find utility in general by reason of their having branched chain structures. Heretofore, various difficulties have been encountered in carrying out normal paraffin isomerization processes, in particular those employing aluminum chloride as the activating agent, and because it has been found that these catalysts are not easily controlled, particularly in their activating tendencies, difficulties arise in carrying out a continuous liquid phase operation. Because of the problem of catalyst segregation in the products in substantial amounts, the clogging of lines and valves with solid catalyst deposits and by reason of the tendency of aluminum chloride, for example, to dissolve or become entrained in the hydrocarbon mixture and to be precipitated out upon a subsequent cooling of the mixture, an unusually high degree of loss of catalyst is obtained in the commercial unit. In other words, before the full activity of the catalyst has been utilized for isomerization, a substantial portion of the catalyst has been removed from the reaction zone due to entrainment and solution in the reactants and reactant mixture. It has previously been proposed to solve the problem of catalyst solution in the hydrocarbons by subjecting the effluent from the isomerization reactor to a shock chilling so as to effectively precipitate out in a suitable manner the dissolved and entrained aluminum chloride, for example. This method, however, has proved to be somewhat cumbersome in operation due to the fact that it becomes necessary to remove solid material from the settler or filter and to convey it back to the isomerization reactor or to utilize the same in some other manner. The process of the present invention is designed to avoid the cumbersome handling of solid material which has heretofore been thought to be necessary in order to conserve the overall aluminum chloride consumption.

It is an object of the present invention to carry out the isomerization of normal paraffins to isoparaffins in the presence of aluminum chloride and a promoter, if desired, in such a manner as to avoid the operating inefficiencies arising by reason of aluminum chloride becoming dissolved in the hydrocarbons contacting the same in the isomerization zone.

It is another object of the invention to more fully utilize the activity of the catalyst inherently present in the effluent from an isomerization reactor.

It is a further object of the invention to conduct a continuous isomerization process employing aluminum chloride as the catalyst in such a manner as to cause a free and uninterrupted flow of the reactants through the unit without substantially altering the activity of the main body of the aluminum chloride and yet to completely and fully realize the full value and full activity of substantially all of the aluminum chloride for isomerizing normal paraffins to isoparaffins.

These objects as well as others which will be apparent upon a fuller understanding of the invention, as hereinafter more specifically described, are accomplished by operating the usual commercial equipment for the isomerization of normal paraffins of at least 4 carbon atoms per molecule in the presence of aluminum chloride wherein the effluent from the isomerization reactor or reactors upon leaving the said reactor or reactors is subjected to a temperature substantially higher than that maintained in the isomerization reaction zone for a short period of time so that the entrained and dissolved aluminum chloride has an opportunity to activate the isomerization reaction under increased activity conditions for a short period of time and, at the same time, resulting in the substantially complete usage of the aluminum chloride contained therein to such an extent that its subsequent recovery in the present process becomes unnecessary and uneconomical, as will be shown hereinafter. By practicing the process of the present invention, improved conversions to the desired products are obtainable and at the same time the main body of the aluminum chloride present in the isomerization reaction zone suffers no excessive degradation, such degradation and increased activity being confined to that small amount of aluminum chloride which is entrained or dissolved by the effluent from the isomerization reactor.

In general, the effluent from the isomerization reactor is heated to a temperature between about 25° F. and about 200° F. more than the temperature maintained in the isomerization reactor from which the effluent emerges, preferably this increase in temperature is maintained between about 50° F. and 100° F. The time of contact of the effluent from the isomerization reaction zone at the increased temperature is maintained between about 5% and about 50% of the time of contact under which the feed stock is maintained in the isomerization reactor proper, preferably between about 10% and about 25% of this isomerization reactor time of contact. The heating zone through which the reacted mixture from the isomerization reactor passes may be of any suitable design, such as, for example, a direct fired furnace, a steam coil running superheated steam, if necessary, or any other similar type of heat exchange equipment. Care, however, should be taken in subjecting the effluent from the isomerization reactor to the increased temperatures to carefully correlate the time of contact and the increased temperature so as to substantially completely utilize the catalytic activity of the dissolved or entrained aluminum chloride, while, at the same time, avoiding the subjecting of the effluent from the isomerization zone to any more severe reaction conditions than are required to accomplish utilization of the aluminum chloride contained therein since more severe reaction conditions only serve to increase the cracking tendency of the hydrocarbon constituents of the effluent thereby lowering the overall yields of the desired isomeric paraffins.

The isomerization reaction conditions in the presence of aluminum chloride and promoter are more or less well known; however, briefly, they may be set forth as follows. In general, a time of contact between about ½ and 10 hours, preferably between about 1 and 4 hours with a temperature between about 20° F. and about 300° F. is used. A catalyst concentration between about 2% and about 100% by weight of the normal paraffins, preferably between about 15% and about 40%, and a catalyst promoter concentration of between about 2% and about 25%, preferably between about 3% and about 12% are suitable except for fixed bed operation. It is realized, of course, that these reaction conditions may be varied over a considerable range depending upon the particular feed stock employed and the proper correlation of conditions therefor. Thus, for example, in the isomerization of n-butane the reaction is usually carried out at temperatures between about 150° F. and about 275° F. with a catalyst concentration depending upon the type of reaction employed of between about 10% and about 100%, although where a bed type of catalyst operation is employed, the concentration is ordinarily much greater, even up to 300–400%. The amount of promoter, for example, hydrogen halide employed is generally between about 3% and about 25% for n-butane isomerization, while the contact time varies between about 0.5 and about 3 hours. In the case of n-pentane less drastic reaction conditions are maintained although the amounts of promoter and catalysts are substantially the same as those employed in the case of n-butane. The temperature, however, is generally maintained between about 40° F. and about 75° F. and the time of contact is maintained between about 1 and about 2 hours. Likewise, less drastic conditions are employed for the isomerization of straight run naphthas.

It is particularly desirable in practicing the process of the present invention to maintain at least sufficient superatmospheric pressure to insure liquid phase operation of the process; thus, for example, when employing n-butane, pressures ranging up to 1000 lbs./sq.in. may be employed, although, in general, pressures no higher than 400 lbs./sq.in. are adequate. One convenient method of obtaining increased pressure comprises introducing gases such as methane or preferably molecular hydrogen into the system. The halogen-containing promoters previously mentioned, for example, hydrogen chloride, also assist in maintaining the superatmospheric pressures. Not only does the hydrogen help to maintain the superatmospheric pressures heretofore mentioned but it likewise has been found to suppress to a certain extent the tendency toward cracking, particularly where the discharged reactant mixture is subjected to the increased temperatures which would ordinarily have a tendency to promote an increased cracking reaction. It is within the contemplation, however, of the present invention to operate in the vapor phase or liquid-vapor phase condition, although the greatest benefits of the present process are realized by operating in a substantially liquid phase.

Various types of feed stocks may be employed in the present process, such as, for example, n-butane, n-pentane, n-heptane and higher homologs. Gasoline, field butane and straight run naphthas predominating in n-paraffins are likewise suitable feed stocks; in general, any hydrocarbon mixture composed predominantly of straight chain paraffins containing at least 4 carbon atoms per molecule is suitable as a feed stock for the present process.

The isomerization reactor may be of any conventional design such as that ordinarily employed for contacting a solid catalyst with either liquids or vapors; thus, for example, a bed type reactor may be employed such as a tower filled with aluminum chloride either as lumps, powder, granules, or the like, or with aluminum chloride supported or impregnated on a suitable carrier such as pumice, kieselguhr, bentonite, montmorillonite, silica and alumina gels, activated carbon, Porocel, alumina bauxite, and the like. It is desirable, to insure adequate reaction in the isomerization zone, that the normal paraffins be intimately and thoroughly contacted with the catalyst. This may be accomplished by passing through a bed, or by agitation where smaller amounts of catalyst are present, such as in a slurry with the reactants, also by mechanical agitating means such as turbo mixers, mechanically driven propellers, jets of restricted internal diameter and similar devices designed to accomplish intimate contact and intensive agitation.

In order to more fully understand the process of the invention, reference may be had to the accompanying drawing which diagrammatically and in sectional elevation proposes a flow plan showing a suitable plant unit for carrying out the process. In order to simplify the drawing, it will be described in connection with n-butane as a feed stock, an aluminum chloride bed as the catalyst mass in the reaction zone and hydrogen chloride as a promoter.

N-butane which may be premixed with hydrogen chloride is introduced under sufficient pressure to maintain it in the liquid phase through line 2 into heater 4 where it is preheated to the desired reaction temperature, for example 150° F. to 225° F. The liquid butane under this pressure is then conducted by means of line 3 into reactor 5. Within or in close proximity to inlet line 3 and the outlet line 7 are small masses of glass wool, rock wool or other suitable material 6 designed to prevent the removal by entrainment of aluminum chloride from the reactor 5. The reactor 5 is substantially filled with aluminum chloride granules or powder or may contain aluminum chloride impregnated on any suitable porous carrier. The total free space throughout the reactor may be maintained at roughly ½ of the reactor volume, although this is oftentimes varied considerably. The rate of throughput of the n-butane through reactor 5 is such as to give a contact time in the reactor of about 0.5 to 2 or even 3 hours. Hydrogen halide may be introduced into the system through line 12 and conducted by means of line 11 into contact with the n-butane entering the system through line 2.

The effluent from reactor 5 is conducted through line 7 by means of a pump (not shown) or to a storage tank or intermediate storage drum and from there by means of a pump (not shown) it is conducted at an independent rate of flow through a heating coil 8 maintained at a temperature of about 250° F. to 300° F. for a period of time of about 20 to 30 minutes depending upon the degree of cracking which the hydrocarbons undergo. During such treatment, of course, the degree of cracking should be maintained at a minimum and, as explained heretofore, this may be accomplished by the maintenance of a substantially positive pressure of molecular hydrogen in the system. The effluent from heater 8 is conducted by means of line 9 into a stripping tower 10 which may be maintained under a reduced pressure from that maintained in the reactor 5 or additional heat may be supplied thereto in order to substantially remove from the desired hydrocarbons, through line 11, the hydrogen chloride, hydrogen, if present, and any light products of the reaction, that is, those boiling below isobutane. All of these overhead effluents may be at least partially or completely removed from the system through line 12, if desired. Generally, however, it is preferred to recycle the overhead until the degradation products ($C_2$ and $C_3$ hydrocarbons) have become built up in amount excessively. Even when they are partially withdrawn through line 12 a separate treatment to segregate hydrogen and/or hydrogen chloride for reuse in the unit may oftentimes be desirable. The withdrawals and additions through line 12 are usually of intermittent character and designed purely to maintain a balanced operation.

The bottoms from stripper 10 are passed either directly into chiller 15 equipped with the cooling jacket 16 by means of line 14 or the bottoms from stripper 10 may be conducted through line 19 into heat interchanger 18 and from thence into cooler 15 by means of line 21 where any traces of aluminum chloride may be separated out and removed from the system through the outlet 26 of chiller 15. The cooled liquid is then conducted either directly to fractionator 25 by means of line 17 or through line 22 back into heat exchange relationship in heat interchanger 18 with the incoming bottoms from stripper 10 and thence from line 24 into fractionator 25. Fractionator 25 is ordinarily designed with some 50 or 60 plates and has a reflux recycle line at or near its top (not shown in the drawing) and a reboiler at or near its bottom. It is maintained under a temperature between about 100° F. and 150° F. and under a pressure of between about 50 and about 250 lbs. per square inch in order to effectively separate isobutane from n-butane. The bottoms in fractionator 25 and consisting chiefly of n-butane are withdrawn from line 29 and may be directed through lines 30 and 32 through reboiler 31 back to fractionator 25 to provide the heat for distillation and proper reflux for the operation of fractionator 25 or the bottoms may be recycled to the isomerization reactor 5 through preheater 4 by means of line 34, but if through inadvertence the heater 8 is operated under too high a temperature or the hydrocarbon mixture subjected to the temperature is maintained thereat too long, a heavy cracking occurs and excessive degradation products are to be found in the bottom of fractionator 25. In this case, outlet line 33 is provided for the removal of n-butane and degradation products for separate treatment to effectively remove the heavy degradation products prior to the recycling of n-butane to preheater 4 and reactor 5.

The drawing has been described with reference to the use of a single reactor and n-butane as the feed stock. It is of course understood that the reactor may contain a mixture of normal paraffins of at least 4 carbon atoms per molecule. Likewise, the reactor may comprise a series of reactors either arranged in series or in parallel so that while one catalyst bed is being regenerated or replenished, the other 2 or 3 reactors remain on stream thereby providing a continuous isomerization reaction. Provision may also be made for the substantially continuous or semi-continuous addition of aluminum chloride to the top of the reactor with the removal of a like volume of spent or substantially spent catalyst from the bottom thereof so that a single reactor is constantly being replenished with fresh catalyst. In such a case it is sometimes advantageous to reverse the flow of n-butane through the reactor so that it first contacts the most nearly spent portion of the catalyst and lastly contacts the most highly active portion of the catalyst. On the other hand, it is desirable in the present process to contact the fresh feed with the most highly active catalyst and to lastly contact the feed with the most spent catalyst. Since, in this manner, the most active catalyst is retained in the reaction zone for the longest period of time and the subsequent heating of the effluent containing the entrained and dissolved catalyst to the elevated temperatures, heretofore described, accomplishes the greatest economies with respect to the greater overall catalytic activity of the aluminum chloride, this latter type process is the preferred procedure.

As illustrative as to the character of the invention but with no intention of limiting the invention thereto, the following examples are given:

Example 1

N-butane having the following analysis: propane and lighter, 0.8%; isobutane, 0.3%; n-butane, 97.9%; pentane and heavier, 1.0%, was mixed with about 13% by weight of hydrogen chloride and heated at a temperature of about 150° F. and under a pressure of about 400 lbs. per square inch. This preheated mixture was charged to a reaction vessel continuously, said reaction vessel being a 400 cc. cylindrical tower of about 1.5 inches in diameter which had previously been substantially filled with aluminum chloride powder. The reaction chamber was maintained under the heretofore mentioned temperature and pressure and the free feed rate to the tower of liquid n-butane was about 0.5 volume per volume of reaction space per hour. The effluent of the reaction vessel was heated with steam to a temperature of about 200° F. as it passed to the subsequent recovery system. During a 12-hour run, the yield of isobutane amounted to about 33%.

*Example 2*

N-butane having the same composition as that specified in Example 1 had mixed therewith about 17% by weight of hydrogen chloride and the mixture was then preheated to the same temperature and pressure as specified in Example 1 and charged to the same reaction vessel as described therein. The reactor was substantially filled as before stated with aluminum chloride powder and the n-butane mixture was charged at the same rate. The effluent from the reactor was heated with steam under pressure so that the temperature of the products was increased to about 250° F. before being discharged therefrom for subsequent treatment and product recovery. The yield of isobutane for a 12-hour period of running was about 50% based on the n-butane charged.

Having thus fully described and illustrated the character of the invention, what is claimed as new and useful and desired to be secured by Letters Patent is:

1. A process for the isomerizing of normal paraffins containing at least 4 carbon atoms per molecule which comprises contacting the same under isomerization reaction conditions in the presence of a solid aluminum chloride catalyst mass and a halogen containing promoter followed by subjecting the effluent from the isomerization reaction zone as a mixture substantially free of solid aluminum chloride and consisting of the reaction products, unreacted feed materials and such amounts of aluminum chloride as have been dissolved in the isomerization reaction zone, to an increased temperature for a period of time sufficient to substantially completely utilize the activity of the dissolved aluminum chloride in the hydrocarbon effluent but for less than a sufficient time to accomplish substantial degradation of the hydrocarbon mixture so treated.

2. A process which comprises contacting at least one normal paraffin containing at least 4 carbon atoms per molecule under isomerization reaction conditions in the presence of a solid aluminum chloride catalyst mass and a halogen containing promoter and subjecting the resultant hydrocarbon effluent as a mixture substantially free of solid aluminum chloride and consisting of the reaction products, unreacted feed materials and such amounts of aluminum chloride as have been dissolved in the isomerization reaction zone, to at least a 25° F. greater temperature than that under which the isomerization reaction was carried out for a period of time between about 5% and about 50% of the time of contact of the reaction mixture in the isomerization reaction zone.

3. A process as in claim 2 wherein the reaction is carried out under superatmospheric pressures sufficient to maintain a liquid phase operation under the reaction conditions obtained.

4. A process as in claim 2 wherein the reaction is carried out under sufficient superatmospheric pressure to maintain the hydrocarbon in the liquid phase under the reaction conditions obtained and wherein at least a portion of the superatmospheric pressure is maintained by reason of the partial pressure of molecular hydrogen in the reaction zone.

5. A process which comprises contacting n-butane under a temperature of between about 150° F. and 275° F. in an isomerization reaction zone for a period of time between about one and about four hours in the presence of between about 2% and about 25% of hydrogen chloride in the presence of between about 10% and about 400% of solid aluminum chloride and removing substantially free of solid material the reacted hydrocarbon mixture, subjecting the latter as a mixture consisting of the reaction products, unreacted feed materials and such amounts of aluminum chloride as have been dissolved in the isomerization reaction zone, to a temperature between about 25° F. and 200° F. higher than the temperature maintained in the isomerization reaction zone for a period of time between about 10% and 25% of the period of time maintained in the isomerization reaction zone and recovering isobutane from the so treated hydrocarbon mixture.

6. A process which comprises contacting n-pentane under a temperature of between about 20° F. and about 175° F. in an isomerization reaction zone for a period of time between about 0.5 and about 3 hours in the presence of between about 2% and about 25% of hydrogen chloride in the presence of between about 10% and about 400% of solid aluminum chloride and removing the reacted hydrocarbon mixture substantially free of solid material, subjecting the reacted mixture as a mixture consisting of the reaction products, unreacted feed materials and such amounts of aluminum chloride as have been dissolved in the isomerization reaction zone, to a temperature between about 25° F. and 200° F. higher than the temperature maintained in the isomerization reaction zone for a period of time between about 10% and 25% of the period of time maintained in the isomerization reaction zone and recovering isopentane from the so treated hydrocarbon mixture.

7. A process which comprises subjecting an effluent from an isomerization reaction of normal paraffin hydrocarbons with solid aluminum chloride, which is substantially free of solid aluminum chloride and which consists of the reaction products, unreacted feed materials and such amounts of aluminum chloride as have been dissolved in the isomerization reaction zone, to a temperature of from between about 25° F. and about 200° F. more than the hydrocarbons were subjected to in said isomerization reaction.

8. A process as in claim 7 wherein the increased temperature ranges between about 50° F. and about 100° F. more than that maintained in said isomerization reaction.

9. A process which comprises contacting n-butane containing about 17% of its weight of hydrogen chloride at a temperature of about 150° F. and under a pressure of about 400 pounds per square inch at a throughput of about 0.5 v./v./hr. with aluminum chloride powder and subjecting the hydrocarbon effluent as a mixture substantially free of entrained solid aluminum chloride and consisting of the reaction products, unreacted feed materials and such amounts of aluminum chloride as have been dissolved in the isomerization reaction zone, to a temperature of about 250° F. prior to the recovery of the isobutane from the reactant mixture.

RALPH BURGESS MASON.